2,942,937
ADSORPTION-BISMUTH PHOSPHATE METHOD FOR SEPARATING PLUTONIUM

Edwin R. Russell, Columbia, S.C., Arthur W. Adamson, Inglewood, Calif., and George E. Boyd, Oak Ridge, Tenn., assignors to the United States of America as represented by the United States Atomic Energy Commission No Drawing. Filed Sept. 9, 1949, Ser. No. 114,902

4 Claims. (Cl. 23—14.5)

This invention relates to the separation of substances present in neutron-irradiated uranium, and more particularly relates to the separation of plutonium from fission products and uranium that are present in neutron-irradiated uranium.

An object of this invention is to provide a method for separating and isolating the various substances present in neutron-irradiated uranium.

An additional object of the present invention is to provide a method for separating plutonium from fission products and neutron-irradiated uranium which comprises the combined use of adsorption and precipitation methods of separation.

Additional objects will be apparent from the following detailed description.

Reference herein to any of the elements is to be understood as denoting the element generically, whether in its free state or in the form of a compound, unless indicated otherwise by the context.

In accordance with the present invention, a solution of neutron-irradiated uranium containing uranium values, plutonium values wherein the plutonium is present in its tri- or tetravalent state, and fission product values is flowed through an adsorbent which selectively adsorbs the various substances present. These substances will tend to be adsorbed in separate strata or layers because of the greater or lesser adsorptive attraction of the adsorbent for the substance contained in the solution. In general, the layers formed will consist of a uranium-containing layer, a fission products-containing layer, and a plutonium-containing layer, although there may be some small over-lapping of the fission product layer with the other two layers. The layers may then be physically separated and the adsorbed substances removed from the adsorbent, or preferably the adsorbed substances may be eluted selectively by passing one or more elutriants through the adsorbent substance. By the proper choice of elutriant, an eluate may be obtained containing material eluted from the uranium zone, the fission products zone, or the plutonium zone. The plutonium eluate will, in general, contain a small percentage of fission products. Further separation of the plutonium and fission products is carried out by the process of this invention by forming a bismuth phosphate carrier precipitate in the plutonium eluate in which the plutonium is still present as tri- or tetravalent ions and separating this precipitate therefrom. This precipitate will carry substantially all of the plutonium present and a portion of the fission products which are phosphate-insoluble. This precipitate is then dissolved, the plutonium oxidized to the hexavalent state in which valence state it is phosphate-insoluble, and the solution contacted with a bismuth phosphate carrier precipitate. This second bismuth phosphate precipitate is then separated from the solution and carries from the solution all of the fission product values originally carried with the first bismuth phosphate precipitate, thus leaving the plutonium in a substantially pure state in the solution.

An alternate method of treating the plutonium-containing eluate to separate the plutonium from the small percentage of fission products present comprises the oxidation of the plutonium in the eluate to the hexavalent state. A bismuth phosphate precipiate is then introduced into the eluate or formed in the eluate and separated therefrom carrying with it the phosphate-insoluble fission products, leaving the plutonium in the solution in a substantially pure state.

It is contemplated that chromatographic adsorption for the preparation of substances present in a solution of neutron-irradiated uranium may be carried out with any adsorbent, including both inorganic and organic adsorbents, natural and manufactured adsorbents. Suitable inorganic adsorbents include silica gels, alumina, diatomaceous earth, and the like. Organic adsorbents include peat, lignite, sulfonated coal, the tannin-formaldehyde resins and the phenol-formaldehyde resins. Particularly advantageous results are obtained by the use of ion exchange adsorbents in which the cation of the adsorbent is exchanged for a similarly charged ion from the substance to be adsorbed. It has been found that the process is particularly effective where the adsorbent used is a relatively inert organic material containing sulfonic acid groups. Thus, the adsorbent may comprise phenol-formaldehyde resins, phenol-tannic acid resins, lignite products, or the like, which contain numerous R—$SO_3$—R' groups in which R is an organic group and in which R' is hydrogen or other replaceable cation, although R' is preferably $H^+$ or $Na^+$. Preferably, the adsorbent is a phenol-formaldehyde condensation product containing some sulfonic acid groups. In the adsorption process the hydrogen or other cation of the sulfonic acid group is deplaced by a cation of the substance to be adsorbed which thereupon forms a more or less loosely associated molecule with the resin. The phenol-formeldahyde polymers containing free methylenesulfonic acid, carboxyl and phenolic groups, having ionizable cations and insoluble anions prepared in accordance with the description contained in U.S. Patent Nos. 2,104,501, 2,151,883, and 2,191,853, of B. A. Adams and B. L. Holmes, are particularly suitable. Another resin, which has been found very suitable for this type work, is a cross-linked aromatic hydrocarbon polymer containing nuclear sulfonic acid groups belonging to the class of compounds described in U.S. Patent 2,366,007.

The over-all rate of adsorption of plutonium, uranium, and fission products is generally dependent upon the particle size of the adsorbent in that more finely-divided adsorbents will give an increased adsorption when plutonium is in contact with the adsorbent for only a short period of time. Thus, a sulfonated phenol-formaldehyde resin of average particle size of 30 mesh will give only 75% adsorption as compared with the 100–200 mesh resin where, in both instances, the plutonium is in contact with the adsorbent for ten minutes. Where the time of contact is two hours or more, the difference between the amounts adsorbed is negligible.

In carrying out the process, the adsorbent is held in an elongated container, commonly referred to as a column, to facilitate the formation of layers or strata of adsorbed substances. The column is preferably of relatively small diameter or cross-section in proportion to its length. The bottom of the column is constructed to permit the passage of the solutions therethrough while retaining the adsorbent therein. Tightly-woven metal screen, glass wool, or the like may be employed for this purpose. The adsorbent is loosely packed in the column with its bed depth adjusted to the number and amounts of adsorbates in the solution to be treated. The particle size of the adsorbent is important in that the smaller the particle size the more rapid the over-all rate of adsorption, although the particle size must not be so fine as to greatly impede the flow of solution through the column. Where ion exchange resins of the sulfonated phenol-formaldehyde type are used, a particle size of between 60 and 100 mesh has been found to be satisfactory.

After the column has been prepared, the solution containing the substances to be adsorbed is flowed through the adsorbent. For layers or strata of adsorbate to be formed, the solution must percolate or flow through the column in one direction. Thus, the solution may flow either up through column or down through column; but, in general, it seems preferable to carry out the operation as a down-flow operation. As the solution flows through the adsorbent, layers of the components are formed in the column according to their adsorption affinities. The layers of adsorbate having the higher adsorption affinities will, in the case of downward flow of solution through the adsorbent, be above the layers of those having lower adsorption affinities. In the case of downward flow of a solution of neutron-irradiated uranium through a phenol-formaldehyde resin bed, a uranium-containing layer will be the lowest layer with a fission product layer above the uranium-containing layer and a plutonium layer above the fission product layer. Where certain of the fission products have similar adsorption affinities, either to plutonium or to the uranium, the layers of uranium and fission products, and the layer of plutonium and fission products may over-lap somewhat. Otherwise, the layers will be well separated from each other. Thus, by a single adsorption cycle the uranium may be substantially completely separated from the plutonium, but the uranium and the plutonium layers will, in general, be somewhat contaminated with fission products.

The neutron-irradiated uranium is normally introduced into the adsorbent column in an aqueous acidic medium. Neutron-irradiated uranium is usually dissolved in concentrated nitric acid and this concentrated uranyl nitrate solution, after proper dilution, may be used to introduce the neutron-irradiated uranium into the column. The concentration of uranyl nitrate in the solution is not critical and widely varying concentrations may be used; however, the concentration of the uranyl nitrate is normally between about .5 and 20% with a 10% uranyl nitrate hexahydrate solution being a most generally suitable solution.

Where the various adsorbed materials are removed from the column by elution, the wash solution or solutions used to desorb the adsorbed substances from the adsorbent may be any solution containing cations exchangeable for the ions to be desorbed. It will be understood that the wash solution will be effective to remove the adsorbate from the adsorbent until such time as substantial equilibrium is reached between the ratio of desorption and readsorption of the particular cation or cations being desorbed. While the dissolved adsorbate may be readsorbed along the column, further amounts of wash solution will again desorb the substances; this will continue until the adsorbate passes out of the column. Water may provide a sufficient condition of dilution for desorption although excessive amounts may be required. In the case of plutonium, fission products, and uranium, it has been found that an aqueous solution of acids is particularly suitable because of the speed of desorption and the relatively small amounts of wash solution required, probably due to their high degree of dissociation. Aqueous solutions of acid-forming substances, for example, mineral acids such as $H_2SO_4$, HCl, or $HNO_3$, acid salts such as $NaHSO_4$, $KHSO_4$, and the like, in varying concentrations have been used satisfactorily. It has been found that uranium is selectively eluted with an acidic elutriant. Particularly desirable elutriants for uranium include $H_2SO_4$ and $H_2C_2O_4$. Following the elution of uranium, the plutonium is eluted from the column with a more basic elutriant than that used for the uranium elution. The examples of highly successful plutonium elutriants include $NaHSO_4$ and $NaHC_2O_4$. By first eluting the adsorbed uranium from a column with an acid solution and then eluting the plutonium from a column with an acid salt solution, two separate solutions may be obtained, the first of which contains substantially all of the uranium adsorbed from the column and a slight amount of fission products, and the second of which contains substantially all of the plutonium adsorbed upon the column contaminated with a small portion of the fission product. By the further process of this invention the plutonium contained in the second solution is separated from substantially all of the fission products contained therein by treatment of said solution with a bismuth phosphate carrier precipitate.

The basis for the separation of plutonium from fission products by the bismuth phosphate carrier precipitate method lies in the fact that plutonium in the hexavalent state is soluble in the presence of bismuth phosphate whereas plutonium ions in the tri- and tetravalent states are insoluble in the presence of a bismuth phosphate precipitate and are carried therewith. In the preferred embodiment of this invention a bismuth phosphate carrier precipitate is formed in the elutriant containing the plutonium fraction obtained in the preceding step of this process. This bismuth phosphate carrier precipitate is then separated from the elutriant, carrying with it the plutonium in the reduced state and such fission products as are phosphate-insoluble, leaving behind in the supernatant solution those fission products which do not form insoluble phosphates. The carrier precipitate is then dissolved, the plutonium oxidized to the hexavalent state, and a second bismuth phosphate precipitate formed in the solution. This bismuth phosphate precipitate is separated from the solution and carries with it the fission products which are phosphate-insoluble products, leaving the plutonium in a substantially pure state in solution. The preferred bismuth phosphate step of the process is particularly suitable where the elutriant of the adsorption step of this process is comprised of an acidic solution of an alkali metal acid sulfate. These acidic solutions usually have between 0.25 and 1.5 M acid concentrations, ordinarily either nitric acid or sulfuric acid, and between about 0.5 and 1.5 M concentration of an alkali metal sulfate salt, such as sodium acid sulfate. A bismuth phosphate plutonium carrier precipitate may be formed in the solution without further adjustment of the acid concentration or of the salt concentration. The concentration of the plutonium-containing solution should be maintained between about 0.25 and 3 M acid concentration prior to the precipitation of the bismuth phosphate precipitate, since below 0.25 M concentration of hydrogen ion, plutonium hydroxide may form and above about 3 M hydrogen ion concentration, bismuth phosphate has a tendency to dissolve. The bismuth phosphate precipitate may be introduced into the plutonium-containing solution in the preformed state, but it is preferably formed in the solution. The bismuth phosphate carrier precipitate may be formed either by the direct strike method, i.e., a soluble bismuth salt first introduced into the solution followed by a soluble phosphate compound, or by the reverse strike method in which the introduction of the compounds is reversed. Bismuth nitrate and bismuth sulfate have been found to be particularly suitable mediums for the introduction of bismuth ions into the solution. Phosphoric acid has been found to be a suitable source of phosphate ions. The concentration of $Bi^{+3}$ ion may be varied quite widely, depending upon the particuar concentrations of plutonium in the solution. Usually, 25 mg. of $Bi^{+3}/10$ cc. of solution is sufficient. When plutonium is present in tracer amounts, it has been found that a concentration of 10 mg. of $Bi^{+3}/10$ cc. of solution will precipitate with phosphate ions and carry substantially all of the plutonium out of solution.

An excess of phosphoric acid is added to the solution to precipitate bismuth, plutonium, and minor amounts of fission products present, as insoluble phosphates. While the concentration of the phosphate ions may be varied greatly, it has been found generally the higher the acidity of the solution, the greater should be the concentration of the phosphate ions. A phosphoric acid concentration in the solution of approximately 0.4 to 1.0 M is usually suitable.

To insure substantially complete precipitation of the bismuth phosphate-plutonium phosphate, the solution may be heated during or after the addition of the phosphate and bismuth ions. Preferably, the solution is heated for approximately an hour at about 75° C. whereupon a substantially complete precipitation of the bismuth phosphate takes place carrying with it substantially all of the plutonium phosphate as well as minor amounts of fission products. Where the plutonium-containing solutions also contain ions which may have a tendency to act as an oxidizing agent upon plutonium ions, for example the nitrate ion, it may be desirable in order to insure the presence of the plutonium in a reduced state, to add small amounts of a reducing agent to said solution, thereby making certain that substantially all of the plutonium present will be in the phosphate-insoluble state. Reducing agents, such as salts of ferrous iron, hydrogen peroxide, hydrazine, or the like, may be used for this purpose. The bismuth phosphate plutonium-containing precipitate is then separated from the solution. This may be accomplished either by centrifugation, decantation, filtration, or any other of the usual methods of separation of insoluble precipitates from solution.

Following the separation of the bismuth phosphate carrier precipitate, the precipitate may be washed and is then redissolved. The dissolving step is usually accomplished by introducing the precipitate into a fairly concentrated nitric acid solution. A 10–15 N nitric acid solution is normally used. Following dissolution, the solution is diluted with water to a suitable acidity for the oxidation of plutonium which follows. Dilution is dependent somewhat upon the oxidizing agent used; for most oxidizing agents, the acidity should be between about 2 and 10 N. If desired, the oxidizing agent or agents can be added before or after dilution. The oxidizing agent or agents in amounts sufficient to oxidize plutonium and convert it to its phosphate-soluble state are added to the solution. While any oxidizing agent having a potential greater than about 1.0 electron volts will tend to oxidize the plutonium, oxidizing agents that have been found to be most suitable for this purpose include bismuthate ion, ferric ion, peroxydisulfate ion and dichromates, such as $K_2Cr_2O_7$, or $Na_2Cr_2O_7$. Where a dichromate is used, the acidity of the solution should be between 2 and 6 N. The dichromate is added in the amount of between 0.001 to 0.1 M and is permitted to react for from one-half to four hours at between 50 and 95° C. Where the solution has an acidity of 2 N and a dichromate in the amount of 0.01 M is used, the solution is preferably heated for approximately one hour at 75° C. Where sodium bismuthate, $NaBiO_3$, in the amount of 0.005 M is used, the solution should be between 3 and 7 N in acid concentration and the solution maintained at a temperature of from 50 to 90° C. for from five minutes to two hours or longer. $Ce^{+4}$ may be used in an amount of 0.02 M with a solution having an acidity or from 2 to 7 N and maintained at 75° C. for from one to two hours. The foregoing ranges given as to amounts, acidity, time, and temperature are the preferred limits where the particular oxidizing agents are used.

The plutonium is thus oxidized to a higher oxidation state, the hexavalent state, in which it remains soluble in the presence of phosphate ion. Also present in the solution, which is between 2 and 10 N acidity, are dissolved bismuth phosphate and fission products. The fission products are then separated from the solution by forming a by-product bismuth phosphate precipitate. This may be accomplished by diluting or neutralizing the solution to approximately 1 N acidity, whereupon bismuth phosphate will again precipitate from the solution. If desired, phosphoric acid in sufficient amounts to bring the solution to between 0.1 and 0.8 M in $H_3PO_4$ may be added to aid in precipitating the bismuth phosphate. The bismuth phosphate will be precipitated and will carry out of the solution the radioactive fission products, such as zirconium, columbium, and the others which were also carried with the original bismuth phosphate precipitate. The plutonium, of course, will remain in solution as it is in the phosphate-soluble state. Thus, this by-product precipitate will leave plutonium in a substantially pure state in solution. The bismuth phosphate by-product precipitate containing the phosphate-insoluble fission products is removed by convenient means, such as filtration or centrifugation. Following the separation of the by-product precipitate from the plutonium-containing solution, the plutonium-containing solution may be concentrated and the plutonium separated from the solution by direct precipitation, by solvent extraction or adsorption, or by any other suitable means.

An alternative method of treating the plutonium-containing elutriant obtained in the first cycle of the process of this invention comprises the oxidation of plutonium contained in said elutriant to the hexavalent state followed by the separation of fission products from said elutriant by means of a bismuth phosphate by-product precipitate. This alternative method of separating plutonium from fission products contained in the elutriant is particularly desirable where the elutriant contains oxalate ions. These oxalate ions should be destroyed prior to the formation of a bismuth phosphate precipitate and a preferable method of accomplishing destruction of the oxalate ion comprises boiling the solution with permanganate. The step of boiling the solution with permanganate ions to effect the destruction of the oxalate ion simultaneously effects the oxidation of the tri- and tetravalent plutonium ions present, to the hexavalent state. Extreme care should be exercised during this step; since vapor or fumes from the boiling solution contain plutonium which is an exceedingly deadly poison. Thus, every precaution should be taken to prevent these fumes from coming in contact with operating personnel. Following the destruction of the oxalate ion and oxidation of the plutonium ions present, a bismuth phosphate precipitate may be formed in the solution in the same manner as previously described and separated therefrom. This precipitate will effectively remove fission products present. The plutonium, present in its phosphate-soluble hexavalent state, will remain in solution. Further treatment of the plutonium to effect its concentration and further purification may then be carried out by any suitable methods.

Now that the broad process of this invention has been described, the invention may be further illustrated by the following specific examples. These examples are given to aid in the explanation of the invention and are not intended to limit the invention to the details described therein.

*Example 1*

Neutron-irradiated uranium, aged for fifty days after irradiation and containing from 1 to 2 grams plutonium in the ionic tetravalent state per metric ton of uranium and 1.5 to 2.5 grams fission products per metric ton of uranium, was dissolved in excess nitric acid and diluted to form an aqueous solution containing 5% uranyl nitrate hexahydrate at a pH of approximately 2.6.

Fifteen liters of this solution was passed through a column containing a synthetic organic cation exchanger of the sulfonated phenol-formaldehyde type containing free methylene-sulfonic acid, carboxyl and phenolic groups. The resin was in the form of pellets of 40 to 60 mesh. The flow rate of the solution was 60 gals./ft.$^2$/hr. The column was 10 mm. in diameter and 41 cm. long and contained 50 grams of the resin which had been previously conditioned by passing a quantity of 5% uranyl nitrate solution through the column until the replaceable cations had been largely replaced by uranyl groups. After the adsorption treatment, the resin was then extracted with 500 cc. of 0.25 M sulfuric acid to remove the uranium which may have deposited on the column. One thousand cc. of 1 M $H_3PO_4$ was then passed through the column to remove most of the fission products deposited. The resin was then extracted with 800 cc. of a solution 0.5 M in $H_2SO_4$ and 1 M in $Na_2SO_4$ at a downward flow of 20 gals./ft.$^2$/hr. to recover the plutonium. The sodium acid sulfate eluate was made 0.8 M in phosphoric acid by the addition of $H_3PO_4$. Bismuth sulfate was then added to the solution in sufficient quantity to make the concentration of bismuth ion in solution 2.5 mg. of $Bi^{+3}$/cc. The precipitate of bismuth phosphate thus formed was digested for two hours at 75° C. The bismuth phosphate precipitate containing plutonium and phosphate-insoluble fission products was then separated from the solution by centrifugation. The precipitate was washed with a very dilute solution of phosphoric acid followed by a water wash. Following the wash the precipitate was dissolved in 10 N nitric acid and the nitric acid solution then diluted to 5 N and sufficient sodium bismuthate introduced into the solution to make the solution 0.01 M in bismuthate ion. This solution was digested at 50° C. for one hour to effect complete oxidation of the plutonium to the hexavalent state. The solution was then made 0.01 M in dichromate ion by the addition of potassium dichromate. This potassium dichromate concentration served as a holding oxidant to maintain the plutonium in the hexavalent state during the by-product precipitation step which followed. The plutonium-containing solution was then further diluted to 1 N in nitric acid concentration and $H_3PO_4$ added to the solution to 0.1 M concentration. The dilution of the solution and addition of the phosphoric acid resulted in the formation of a bismuth phosphate precipitate containing substantially all of the fission products remaining in the solution. This precipitate was digested in the solution for one hour at 75° C. and then separated from the solution by centrifugation, carrying substantially all of the fission products from solution, and leaving the plutonium in solution, substantially uncontaminated with fission products.

*Example II*

A uranyl nitrate solution containing plutonium was prepared by dissolving neutron-irradiated uranium in nitric acid. The concentration of plutonium was approximately 250 parts plutonium per million parts uranium and the concentration of fission products was approximately 400 parts of fission products per million parts of uranium. This solution was made to a 5% uranyl nitrate hexahydrate solution and the solution was passed through a column containing a phenolic-formaldehyde cation exchange resin of 60 to 100 mesh set up as a bed 19 mm. in diameter and 42.5 cm. high. At the end of the adsorption the uranium was completely eluted from the resin bed by passing 500 cc. of 0.25 M $H_2SO_4$ through the column at an upflow rate of 20 gals./ft.$^2$/hr. The plutonium was then eluted from the bed by passing 500 cc. of 0.5 M $H_2SO_4$ and +1 M $Na_2CO_4$ through the column at the same rate as the uranium elutriant. Sodium bismuthate was then added to the plutonium-containing elutriant to a concentration of bismuthate of 0.01 M and the solution maintained at a temperature of 75° C. for one hour to effect complete oxidation of the plutonium to the hexavalent state. Potassium dichromate was then added to the solution as a holding oxidant to give a concentration of 0.002 N in $Cr_2O_7^=$ ion in the solution. The solution was cooled to 35° C and bismuth ion as bismuth nitrate was added to the solution to a concentration of 1.8 grams/liter. Sufficient phosphoric acid was then added to the solution to make the solution 0.4 M in phosphoric ion. The bismuth phosphate precipitate containing fission products, thus formed, was digested at 75° C. for one hour, the solution then cooled and the bismuth phosphate-fission products precipitate filtered from the solution. The plutonium ions in the solution were then reduced from the hexavalent to the tetravalent state by making the solution 0.03 M in ferrous ion and maintaining the temperature of the solution at 75° C. for one hour. The plutonium was then separated from the solution with a bismuth phosphate carrier. The bismuth phosphate carrier precipitate was formed by making the solution 0.8 M in $H_3PO_4$ and adding bismuth ion to the solution to give a concentration of 2.5 grams/liter. This bismuth phosphate plutonium-containing precipitate was digested for one hour at 75° C., then cooled and filtered from the solution.

The above detailed description is given only for purpose of illustration and the invention is to be limited only by the scope of the appended claims.

What is claimed is:

1. The process of separating plutonium from uranium and fission products which comprises contacting a solution of neutron-irradiated uranium containing plutonium in a reduced state with a cation exchange resin to adsorb plutonium and uranium, selectively eluting plutonium from the adsorbent by passing an elutriant through said resin, separating the plutonium from the fission products dissolved in said elutriant by oxidizing the plutonium to the phosphate-soluble hexavalent state, then contacting the elutriant with a bismuth phosphate carrier precipitate, and separating said bismuth phosphate carrier precipitate together with associated fission products from the plutonium-containing elutriant.

2. The process of claim 1 wherein the adsorbent is a synthetic cation exchange resin of the sulfonated phenolformaldehyde type.

3. The process of claim 1 wherein the adsorbent is an artificial cation exchange resin of the cross-linked aromatic hydrocarbon polymer type containing nuclear sulfonic acid groups.

4. The process of separating plutonium from uranium and fission products which comprises passing an aqueous acidic solution of neutron-irradiated uranium containing plutonium values in a valence state less than +5 through a bed of a cation exchange adsorbent resin, whereby plutonium, uranium, and fission products are selectively adsorbed, selectively eluting plutonium from said resin by passing an aqueous acidic elutriant through said resin bed, adding bismuth ions and phosphate ions to form a bismuth phosphate precipitate in the plutonium-containing eluate thus obtained, separating said bismuth phosphate carrier precipitate together with associated plutonium and fission products, dissolving said precipitate in an aqueous acidic solution, oxidizing the plutonium values contained therein to the hexavalent state by treatment of the solution with an oxidizing agent having a potential more negative than about −1.0 volt, forming a bismuth phosphate carrier precipitate in said solution, removing said precipitate together with associated fission products from said solution, leaving the plutonium in solution.

References Cited in the file of this patent

UNITED STATES PATENTS

| | | |
|---|---|---|
| 2,711,362 | Street | June 21, 1955 |
| 2,785,951 | Thompson et al. | Mar. 19, 1957 |
| 2,813,004 | Wahl | Nov. 12, 1957 |
| 2,855,269 | Boyd et al. | Oct. 7, 1958 |

OTHER REFERENCES

CN-728, U.S. Atomic Energy Commission document dated June 21, 1943, pages 36–45 and 50–63.

Tompkins et al.: "Ion Exchange as a Separations Method," Journal of the American Chemical Society, vol. 69, pages 2769–2777 (November 1947).